United States Patent
Kuo

(12) 
(10) Patent No.: US 6,321,029 B1
(45) Date of Patent: Nov. 20, 2001

(54) DC FAN HAVING A POWER SLEEP-MODE CONTROL UNIT AND METHOD FOR CONTROLLING THE SAME

(75) Inventor: Kuei-wei Kuo, Hsinchu (TW)

(73) Assignee: Winson Semiconductor Corporation (TW)

( * ) Notice: Subject to any disclaimer, the term of this patent is extended or adjusted under 35 U.S.C. 154(b) by 0 days.

(21) Appl. No.: 09/525,006

(22) Filed: Mar. 14, 2000

(51) Int. Cl.$^7$ ........................................... H02P 5/00
(52) U.S. Cl. .................... 388/800; 388/909; 318/471; 713/323
(58) Field of Search .................. 388/800, 831, 388/909, 934; 318/471, 472; 713/300, 310, 320, 323

(56) References Cited

U.S. PATENT DOCUMENTS

| | | | |
|---|---|---|---|
| 4,856,078 | * 8/1989 | Konopka | 388/831 |
| 5,457,766 | * 10/1995 | Ko | 388/831 |
| 5,469,320 | * 11/1995 | Walker et al. | 361/33 |
| 5,513,361 | * 4/1996 | Young | 395/750 |
| 5,687,079 | * 11/1997 | Bauer et al. | 364/175 |
| 5,848,282 | * 12/1998 | Kang | 395/750.05 |
| 5,974,557 | * 10/1999 | Thomas et al. | 713/322 |
| 6,037,732 | * 3/2000 | Alfano et al. | 318/471 |
| 6,182,232 | * 1/2001 | Klein | 713/340 |

* cited by examiner

*Primary Examiner*—Robert E. Nappi
*Assistant Examiner*—Rina I. Duda

(57) ABSTRACT

A DC fan using a power supply and sleep/non-sleep-mode signals for controlling the rotating speed thereof includes a DC brushless motor and a power sleep-mode control unit. The DC brushless motor serves as a driving source of the DC fan. The power sleep-mode control unit is electrically connected to the DC brushless motor for receiving the power supply and the sleep/non-sleep-mode signals, thereby outputting an operating power supply and controlling the rotating speed of the DC brushless motor.

6 Claims, 2 Drawing Sheets

DC FAN HAVING A POWER SLEEP-MODE CONTROL UNIT AND METHOD FOR CONTROLLING THE SAME

FIELD OF THE INVENTION

The present invention relates to a DC fan and a method for controlling the same, and more particularly, to a DC (direct current) fan having a DC brushless motor and a method for controlling the rotating speed thereof.

BACKGROUND OF THE INVENTION

In these years, need for electrical products has been greatly increased. Auto shutdown functions of the electrical products are very important for reducing the power consumption and for increasing the lives of electrical products. An auto shutdown function can be performed by a power sleep-mode control. For example, the power sleep-mode of a monitor can be set in a personal computer. In this case, the monitor can be switched to the power sleep-mode under the condition that no input signals to the monitor are generated from a keyboard or a mouse during a predetermined period of time set by the user. Therefore, the power consumption can be reduced, and the life of the monitor can be prolonged. Similarly, a hard disk in a computer, a printer, a power supply, or other electrical products can be switched to their power sleep-modes.

A conventional DC brushless motor is usually used for driving a cooling fan in a computer or a workstation. The cooling fan operates when the computer or workstation is switched on till the time when the computer or workstation is switched off or when the fan fails to operate. In general, an operation period of a computer or workstation is very long. When any part or electrical element of a computer is switched to its power sleep-mode, the corresponding cooling fan can reduce its rotating speed or even stop in order to reduce power consumption and prolong its life.

The power sleep-mode has not been utilized in conventional cooling fans for saving power consumption and prolonging their lives.

Conventionally, a pulse width modulation (PWM) method is widely used for controlling the rotating speed of a cooling fan. According to the method, the rotating speed is controlled by modulating the amount of voltage or current inputted to a DC motor of the cooling fan. However, a circuit for carrying out this method is complicated and consumes a lot of electrical power.

SUMMARY OF THE INVENTION

It is therefore an object of the invention to provide a DC fan having a power sleep-mode control unit in order to save power consumption and to prolong the life of the DC fan.

In accordance with a first aspect of the invention, a DC fan using a power supply and sleep/non-sleep-mode signals for controlling the rotating speed thereof includes a DC brushless motor as a driving source of the DC fan, and a power sleep-mode control unit electrically connected to the DC brushless motor for receiving the power supply and for generating sleep/non-sleep-mode signals, thereby outputting an operating power supply and controlling the rotating speed of the DC brushless motor.

The DC fan can be selectively shifted to its power sleep-mode. Thereby, its power consumption can be reduced and its life can be prolonged.

In accordance with a second aspect of the invention, the DC fan according to the first aspect further includes a sleep/non-sleep-mode signal venerating unit electrically connected to the power sleep-mode control unit for generating sleep/non-sleep-mode signals, and a firmware for generating time ratio control signals inputted to the sleep/non-sleep-mode signal generating unit. The sleep-mode signals and non-sleep-mode signals are alternately and continuously generated from the sleep/non-sleep-mode signal generating unit, and the rotating speed of the DC fan is controlled by a time ratio of the duration of the sleep-mode signals to the duration of the non-sleep-mode signals.

The rotating speed of the DC fan can be controlled according to the time ratio of the duration of the sleep-mode signals to the duration of the non-sleep-mode signals.

In accordance with a third aspect of the invention, the DC fan according to the second aspect further includes a sensor for detecting the ambient temperature of the DC fan, and outputting detection signals to the firmware to control outputs of the firmware.

The rotating speed of the DC fan can be controlled according to the ambient temperature of the DC fan.

In the DC fan according to the second aspect of the invention, the minimum time ratio of the duration of the sleep-mode signals to the duration of the non-sleep-mode signals is set to keep the DC brushless motor from stopping.

In the DC fan according to the third aspect of the invention, the firmware is composed of a computer and the software for use with the computer. The rotating speed of the DC fan can be controlled by the software.

In accordance with the fourth aspect of the invention, a method for controlling the rotating speed of a DC fan, the DC fan includes a DC brushless motor and a power sleep-mode control unit, the method includes the steps of: outputting first signals from an input signal generating unit to a signal control unit and processing the first signals by the signal control unit; outputting second signals from the signal control unit to a central processing unit and processing the second signals by the central processing unit; outputting third signals from the central processing unit to a sleep/non-sleep-mode signal generating unit and processing the third signals by the sleep/non-sleep-mode signal generating unit; and outputting sleep/non-sleep-mode signals from the sleep/non-sleep-mode signal generating unit to the DC brushless motor, and controlling the rotation/stop of the DC brushless motor by the power sleep/non-sleep-mode signals and the power supply. When the input signal generating unit has not generated the first signals for a predetermined period of time, the sleep/non-sleep-mode signal generating unit generates sleep-mode signals to let the DC brushless motor stop. When the input signal generating unit has generated the first signals continuously for the predetermined period of time, the sleep/non-sleep-mode signal generating unit generates non-sleep-mode signals to let the DC brushless motor rotate normally.

In accordance with the fifth aspect of the invention, a method for controlling the rotating speed of a DC fan, which includes a DC brushless motor and a power sleep-mode control unit, includes the steps of: alternately and continuously outputting sleep/non-sleep-mode signals from a sleep/non-sleep-mode signal generating unit to the DC brushless motor; and controlling the rotating speed of the DC fan by the cooperation of a time ratio of the duration of the sleep-mode signals to the duration of the non-sleep-mode signals and the moment of inertia of the DC fan.

The rotation/non-rotation states of the DC fan can be controlled by the method of using the power sleep/non-sleep mode.

In accordance with the sixth aspect of the invention, the method according to the fifth aspect of the invention further includes the steps of: detecting the ambient temperature of the DC fan by a sensor and outputting detection signals; and receiving the detection signals by a firmware and outputting time ratio control signals to the sleep/non-sleep-mode signal generating unit according to the detection signals, the time ratio of the duration of the sleep-mode signals to the duration of the non-sleep-mode signals being controlled according to the time ratio control signals.

DETAILED DESCRIPTION OF THE PREFERRED EMBODIMENTS

1. First Embodiment

Figure 1:
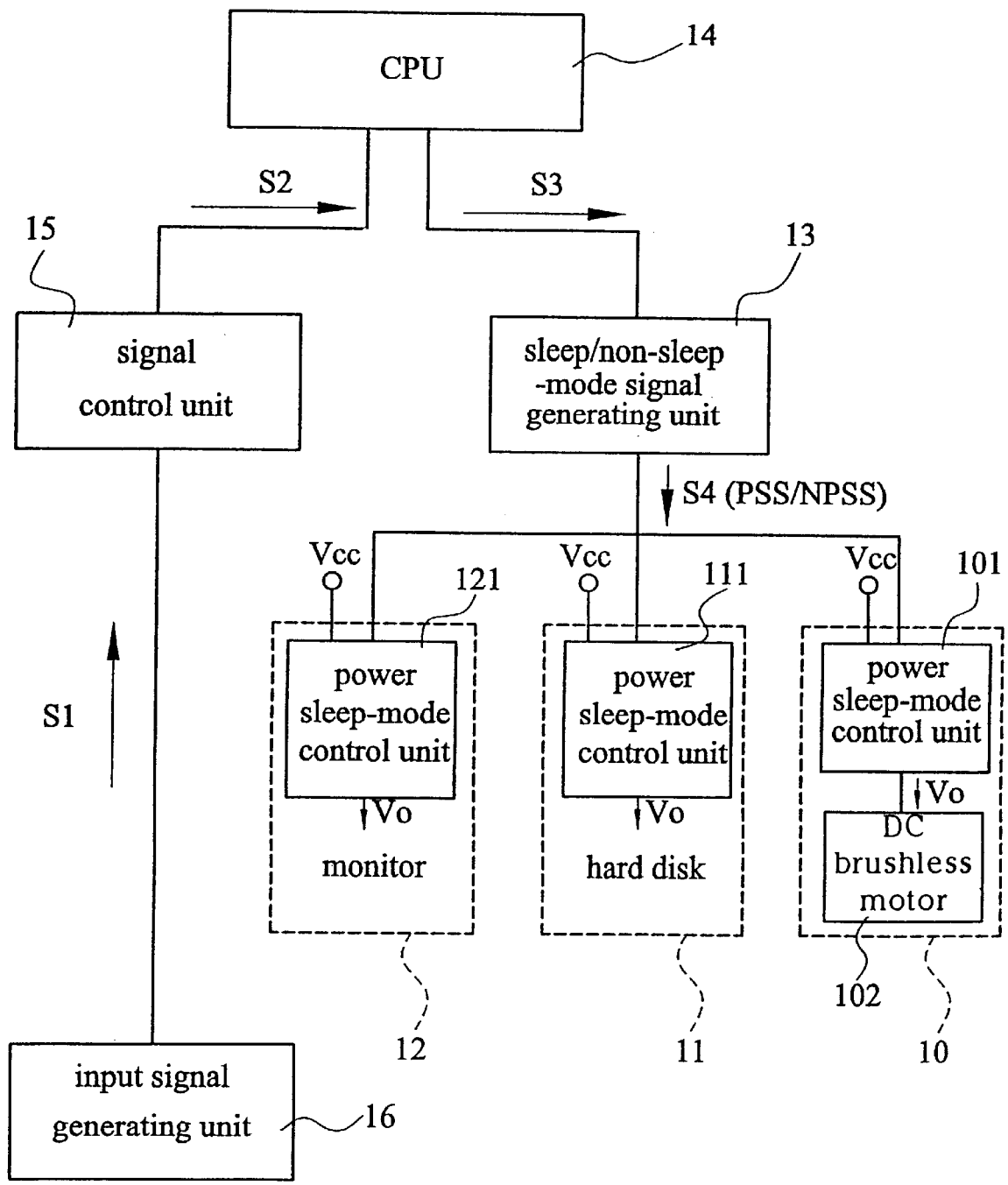
FIG. 1 is a block diagram illustrating the components of a computer system in accordance with a first embodiment of the invention.

Referring to FIG. 1, a computer system in accordance with a first embodiment of the invention includes a DC fan 10, a hard disk 11, a monitor 12, a sleep/non-sleep-mode signal generating unit 13, a central processing unit 14, a signal control unit 15, and an input signal generating unit 16.

The DC fan 10 has a DC brushless motor 102 as its driving source, a power sleep-mode control unit 101, and a rotor (not shown). The rotor includes a rotation shaft, a coil, and an impeller which are not shown, and thus possesses a moment of inertia during operation. The hard disk 11 and monitor 12 also include a power sleep-mode control unit 111 and a power sleep-mode control unit 121 respectively.

First signals S1 are generated from the input signal generating unit (e.g. a mouse or keyboard) 16 in response to an input action of the user. The signal control unit 15 receives the first signals S1 and processes it to generate second signals S2. The central processing unit 14 receives the second signals S2 and processed it to generate third signals S3. The sleep/non-sleep-mode signal generating unit 13 receives the third signals S3 and processes it to generate sleep/non-sleep-mode signals S4. The sleep/non-sleep-mode signals S4 is supplied to the monitor 12, hard disk 11, and DC fan 10. Each of the monitor 12, hard disk 11, and DC fan 10 is also supplied with a power supply voltage Vcc.

The sleep/non-sleep-mode signals S4 can be one of two kinds of signals, i.e., sleep-mode signals PSSs and non-sleep-mode signals NPSS. The sleep-mode signals PSSs and the non-sleep-mode signals NPSSs cannot be generated simultaneously.

When the power sleep-mode control units 101, 111, and 121 receive the sleep-mode signals PSSs, an operation power supply Vo, which can be a voltage or current of a zero or a near zero value, is outputted from the power sleep-mode control units 101, 111, and 121. Thus, the DC fan 10, hard disk 11, and monitor 12 stop operating or operate in their sleep-modes. For example, the sleep-mode signals PSSs causes the DC brushless motor 102 in the DC fan 10 to rotate in a low speed or to stop.

When the power sleep-mode control units 101, 111, and 121 receive the non-sleep-mode signals NPSSs, an operation power supply Vo of a predetermined operating voltage or current is outputted from the power sleep-mode control units 101, 111, and 121. Thus, the DC fan 10, hard disk 11, and monitor 12 operate normally or operate in their non-sleep-modes. For example, a non-sleep-mode signals NPSSs causes the DC brushless motor 102 in the DC fan 10 to rotate in a normal speed.

It should be noted that one kind of the non-sleep-mode signals NPSSs and the sleep-mode signals PSSs can be low level signals, and the other kind can be high level signals. Under this condition, the ON/OFF status of the power sleep-mode control units 101, 111, and 121 can be controlled merely by the non-sleep-mode signals NPSSs or the sleep-mode signals PSSs. For example, under the condition of the non-sleep-mode (to be described later) the sleep/non-sleep-mode signals S4 are low level signals. Therefore, the power sleep-mode control units 101, 111, and 121 are not affected by the sleep/non-sleep-mode signals S4, and the DC fan 10, hard disk 11, and monitor 12 operate normally. Under the condition of the power sleep-mode (to be described later), the sleep/non-sleep-mode signals S4 are high level signals. Therefore, the DC fan 10, hard disk 11, and monitor 12 operate in their sleep-modes.

The power sleep-mode is described in the following.

When the user has not performed any input action to the input signal generating unit (e.g. a keyboard or mouse) 16 for a predetermined period of time (for example, 30 minutes), the signal control unit 15 does not receive or output any signals. As a result, the first signals S1 and the second signals S2 have kept as low level signals for the predetermined period of time. When the central processing unit 14 has not received the high level signals for the predetermined period of time, it makes a decision to start a power sleep-mode and generate third signals S3. The third signals S3 are outputted to the sleep/non-sleep-mode signal generating unit 13, causing the sleep/non-sleep-mode signal generating unit 13 to generate the sleep-mode signals PSSs. Then, the monitor 12, hard disk 11, and DC fan 10 are shifted to their sleep-modes. In this case, the whole computer system is in its sleep-mode and the DC brushless motor 102 rotates in a low speed or does not rotate.

The non-sleep-mode is described in the following.

When the user performs an input action to the input signal generating unit (e. g. a keyboard or mouse) 16, the signal control unit 15 receives first signals S1 and outputs second signals S2. The central processing unit 14 receives the second signals S2 and makes a judgement that the power sleep-mode is ended, or a non-sleep-mode is continued. Then, third signals S3 is generated and is inputted to the sleep/non-sleep-mode signal generating unit 13, causing the sleep/non-sleep-mode signal generating unit 13 to generate non-sleep-mode signals NPSSs. As a result, the monitor 12, hard disk 11, and DC fan 10 are in their non-sleep-modes. In this case, the overall computer system is in its non-sleep-mode and the DC brushless motor 102 rotates normally.

Therefore, according to the first embodiment, the DC fan 10 receives the sleep/non-sleep-mode signals S4, and is shifted between the power sleep-mode and the non-sleep-mode. The DC brushless motor 102 can rotate in either a normal speed or a low (zero) speed. This control function of a DC brushless motor has not been utilized in the prior art.

The effect of the first embodiment will be described in the following by way of example.

The DC fan 10 in accordance with the first embodiment consumes a current of 110 mA to 250 mA in its non-sleep-mode, and consumes a current of 3.5 mA in its sleep-mode. The power consumption in the power sleep-mode can be reduced to 2% of that in the non-sleep-mode.

2. Second Embodiment

According to the control methods of the above power sleep-mode and non-sleep-mode and the moment of inertia of the rotor of the DC fan 10, the rotating speed of the DC fan 10 can be controlled.

Figure 2:
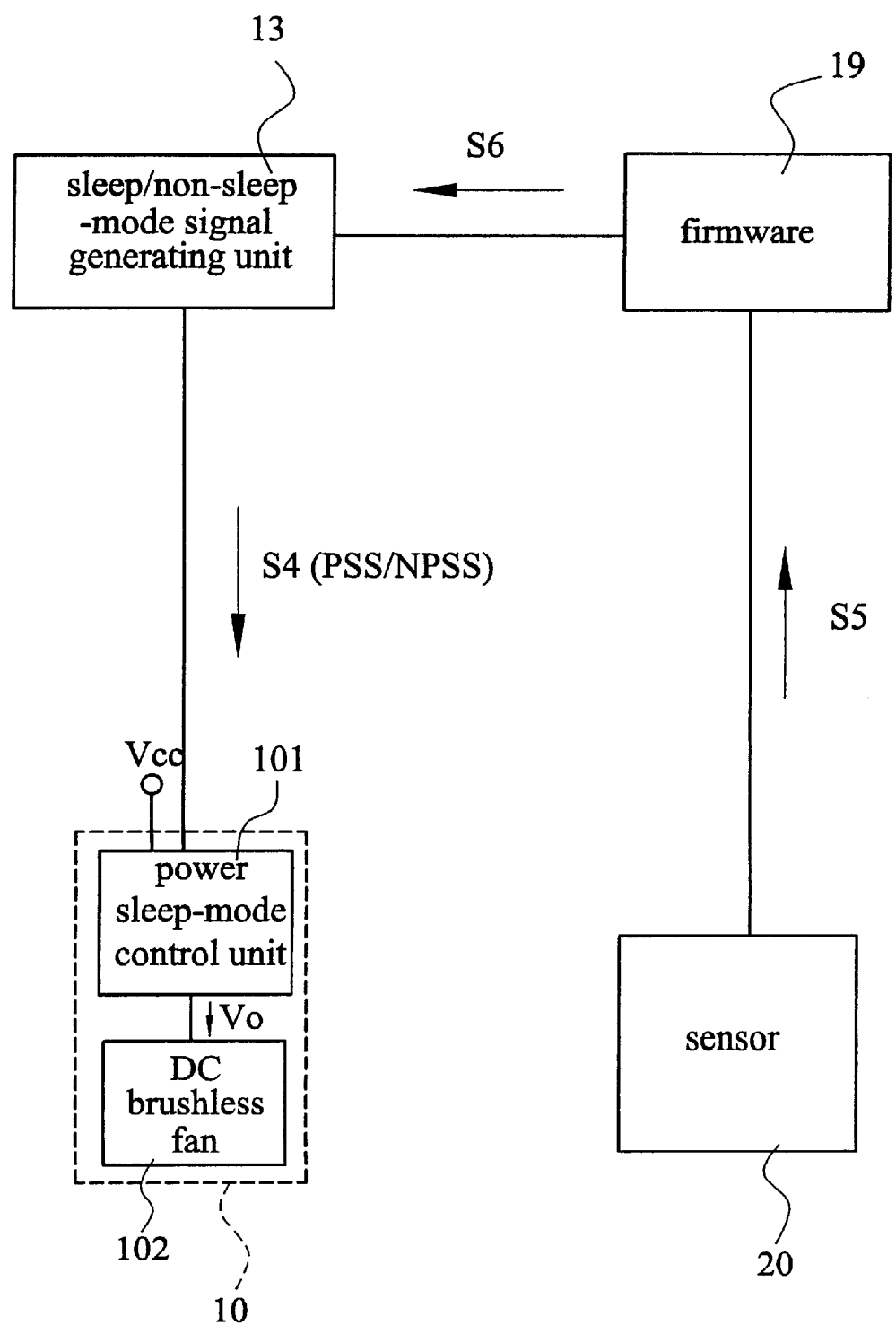
FIG. 2 is a block diagram illustrating a DC fan in accordance with a second embodiment of the invention and the peripheral devices for controlling the DC fan.

Referring to FIG. 2, a rotating speed control system of a DC fan includes a DC fan 10, a sleep/non-sleep-mode signal generating unit 13, a firmware , and a sensor 20. The DC fan 10 includes a power sleep-mode control unit 101 and a DC brushless motor 102. The DC brushless motor 102 has a rotor (not shown). The rotor includes a rotation shaft, a coil, and an impeller (not shown), and thus possesses a moment of inertia during operation.

The sensor 20 is used for detecting the ambient temperature of the DC fan 10, and outputs detection signals S5 to the firmware . The detection signals S5 are processed by the firmware , and time ratio control signals S6 are outputted. For example, the programs and data can be stored in the firmware from which the time ratio control signals S6 corresponding to the detection signals S5 are outputted. The sleep/non-sleep-mode signal generating unit 13 receives the time ratio control signals S6 and performs a process to input sleep/non-sleep-mode signals S4. The sleep/non-sleep-mode signals S4 includes a kind of sleep-mode signals PSSs and a kind of non-sleep-mode signals NPSSs, both of which are not generated simultaneously. The time ratio of the duration of the sleep-mode signals PSSs to the duration of the non-sleep-mode signals NPSSs can be controlled according to the time ratio control signals S6.

The power sleep-mode control unit 101 receives a power supply Vcc and a sleep/non-sleep-mode signals S4, and generates an operation power supply Vo. The operation power supply Vo is directly inputted to the DC brushless motor 102. The rotating speed of the DC brushless motor 102 can be controlled by the amount of voltage (or current) of the operation power supply Vo.

The method for controlling the rotating speed of the DC fan will be described in detail hereinbelow by way of example.

Assuming that the normal rotating speed of the DC fan is 2000 rpm. A rotating speed of 2000 rpm can be obtained if the non-sleep-mode signals NPSSs are generated from the sleep/non-sleep-mode signal generating unit 13 continuously. On the other hand, a rotating speed of 1000 rpm can be obtained when the non-sleep-mode signals NPSSs and the sleep-mode signals PSSs are generated alternately for a certain period of time, wherein the time ratio of the duration of the non-sleep-mode signals NPSSs to the duration of the sleep-mode signals PSSs is 1:1. In this case, the DC brushless motor 102 increases its rotating speed when being driven, and slightly decreases its rotating speed, which is due to its moment of inertia, when not being driven. Thereafter, the DC brushless motor 102 can be driven again, causing the rotating speed to rise again. Therefore, the rotating speed of the brushless motor 102 can be controlled by way of intermittent driving.

In some cases, however, the duration of the non-sleep-mode signals NPSSs and the duration of the sleep-mode signals PSSs have to be limited in order to avoid power consumption incurred by the maximum static friction force when restarting the motor. Therefore, when the rotating speed of the DC brushless motor 102 changes, it is preferred that the intermittent driving is performed till the DC brushless motor 102 reaches a predetermined rotating speed. The predetermined rotating speed can be obtained by controlling the duration of the non-sleep-mode signals NPSSs and the duration of the sleep-mode signals PSS. In addition, after the DC brushless motor 102 reaches the predetermined rotating speed, it is preferable that the maximum duration of the non-sleep-mode signals NPSSs is limited to prevent the DC brushless motor 102 from reaching the normal rotating speed. Similarly, it is also preferable that the maximum duration of the sleep-mode signals PSSs is limited in order to prevent the DC brushless motor 102 from stopping. Furthermore, it is also preferable that the duration of the non-sleep-mode signals NPSSs and the duration of the sleep-mode signals PSSs are limited to an appropriate range in order to avoid the over fluctuation of the rotating speed of DC brushless motor 102.

On the other hand, the embodiment can be used in a computer system. In this case, the computer system serves as the firmware as shown in FIG. 2, and is more adjustable. Software can be programmed to control the rotating speed of the DC fan according to the timing or the ambient temperature of the DC fan 10. With regard to the timing control, for example, the software can be programmed to gradually decrease the rotating speed of the DC fan from 10:00 PM to 07:00 AM by the power sleep/non-sleep-mode. In this case, the sensor 20 can be removed. With regard to the temperature control, for example, the software can be programmed to control the ambient temperature of the DC fan or the temperature of the CPU (central processing unit) of the computer. It is preferable that the rotating speed of the DC fan increases as the temperature of CPU rises.

While the invention has been described by way of example and in terms of the preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. The DC (direct current) fan using a power supply and sleep/non-sleep-mode signals for controlling the rotating speed thereof, comprising:

a DC brush less motor as a driving source of said DC fan;

a power sleep-mode control unit electrically connected to said DC brushless motor for receiving the power supply and the sleep/non-sleep-mode signals, thereby outputting an operating power supply and controlling the rotating speed of said DC brushless motor;

a sleep/non-sleep-mode signal generating unit electrically connected to said power sleep-mode control unit for generating the sleep/non-sleep-mode signals; and firmware for generating time ratio control signals inputted to said sleep/non-sleep-mode signal generating unit, thereby the sleep-mode signals and non-sleep-mode signals are generated alternately for a predetermined period of time by said sleep/non-sleep-mode signal generating unit, and the rotating speed of said DC fan is controlled by a time ratio of the duration of the sleep-mode signals to the duration of the non-sleep-mode signals.

2. The DC fan according to claim 1 further comprising a sensor for detecting the ambient temperature of said DC fan, and outputting detection signals to said firmware to control the output of said firmware.

3. The DC fan according to claim 1, wherein the minimum time ratio of the duration of the sleep-mode signals to the duration of the non-sleep-mode signals is set to keep said DC brushless motor from stopping.-

4. The DC fan according to claim 2, wherein said firmware is composed of a computer and the software for use with the computer.

5. A method for controlling the rotating speed of a DC fan, said DC fan including a DC brushless motor and a power sleep-mode control unit, the method comprising the steps of:

outputting sleep-mode signals and non-sleep-mode signals from a sleep/non-sleep-mode signal generating unit to said DC brushless motor alternately and continuously; and controlling the rotating speed of said DC fan by the cooperation of a time ratio of the duration of the sleep-mode signals to the duration of the non-sleep-mode signals and the moment of inertia of said DC fan.

6. The method according to claim 5 further comprising the steps of:

detecting the ambient temperature of said DC fan by a sensor and outputting detection signals; and receiving the detection signals by firmware and outputting time ratio control signals to said sleep/non-sleep-mode signal generating unit according to the detection signals, the time ratio of the duration of the sleep-mode signals to the duration of the non-sleep-mode signals being controlled according to the time ratio control signals.

\* \* \* \* \*